US008947419B2

(12) United States Patent
Yanagi et al.

(10) Patent No.: US 8,947,419 B2
(45) Date of Patent: Feb. 3, 2015

(54) DISPLAY CONTROLLER, DISPLAY DEVICE, DISPLAY SYSTEM, AND METHOD FOR CONTROLLING DISPLAY DEVICE

(71) Applicant: Sharp Kabushiki Kaisha, Osaka (JP)

(72) Inventors: Toshihiro Yanagi, Nara (JP); Takuji Miyamoto, Nara (JP); Atsuhito Murai, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/183,858

(22) Filed: Feb. 19, 2014

(65) Prior Publication Data

US 2014/0168199 A1 Jun. 19, 2014

Related U.S. Application Data

(63) Continuation of application No. 12/309,671, filed as application No. PCT/JP2007/056350 on Mar. 27, 2007, now Pat. No. 8,692,822.

(30) Foreign Application Priority Data

Jul. 31, 2006 (JP) ................................ 2006-209146

(51) Int. Cl.
*G06F 3/038* (2013.01)
*G09G 3/36* (2006.01)
*G09G 5/18* (2006.01)

(52) U.S. Cl.
CPC ................ *G09G 5/18* (2013.01); *G09G 3/3611* (2013.01); *G09G 2310/08* (2013.01); *G09G 2340/0435* (2013.01); *G09G 2310/0283* (2013.01)
USPC ............................................ 345/213; 345/99

(58) Field of Classification Search
CPC ............................................ G09G 2340/0435
USPC ......................................................... 345/213
See application file for complete search history.

(56) References Cited

U.S. PATENT DOCUMENTS

| | | | |
|---|---|---|---|
| 6,831,634 | B1 | 12/2004 | Shigeta |
| 7,079,129 | B2 | 7/2006 | Shigeta |
| 2002/0036636 | A1 | 3/2002 | Yanagi et al. |
| 2002/0041281 | A1 | 4/2002 | Yanagi et al. |

(Continued)

FOREIGN PATENT DOCUMENTS

| | | |
|---|---|---|
| JP | 10-010489 | 1/1998 |
| JP | 2003-255902 | 9/2003 |

(Continued)

OTHER PUBLICATIONS

Office Action for related U.S. Appl. No. 12/309,671 dated Jul. 6, 2012.

(Continued)

*Primary Examiner* — Abbas Abdulselam
*Assistant Examiner* — Sarvesh J Nadkarni
(74) *Attorney, Agent, or Firm* — Harness, Dickey & Pierce, P.L.C.

(57) ABSTRACT

In one embodiment of the present application, a display controller is capable of changing a refresh rate, indicative of how often a screen displayed on a display device having a plurality of pixels is switched, between a low refresh rate of 40 Hz and a normal refresh rate of 60 Hz and generates (i) a dot clock (reference clock) serving as a timing signal indicative of a timing of operation in the display device, (ii) video data indicative of an image to be displayed on the screen, (iii) Hsync for defining a horizontal period of a display on the screen, and (vi) Vsync for defining a vertical period of the display on the screen, so as to supply the dot clock, the video data, Hsync, and Vsync to the display device, wherein the display controller includes a dot clock generation circuit for generating the reference clock whose frequency is constant without depending on a change of the refresh rate. This makes it possible to provide the display controller which can suppress occurrence of noise also in switching the refresh rate and which does not allow any screen derangement which is caused by the noise.

4 Claims, 15 Drawing Sheets

(56) References Cited

U.S. PATENT DOCUMENTS

| | | | |
|---|---|---|---|
| 2002/0126083 | A1 | 9/2002 | Cairns et al. |
| 2004/0228265 | A1 | 11/2004 | Ota |
| 2005/0078101 | A1 | 4/2005 | Shigeta |
| 2007/0002036 | A1 | 1/2007 | Kardach et al. |

FOREIGN PATENT DOCUMENTS

| | | |
|---|---|---|
| JP | 2004-151222 | 5/2004 |
| JP | 2004-252481 | 9/2004 |
| JP | 2004-287164 | 10/2004 |
| JP | 2004-341358 | 12/2004 |
| JP | 2005-003692 | 1/2005 |
| JP | 2006-084758 | 3/2006 |

OTHER PUBLICATIONS

Notice of Allowance for related U.S. Appl. No. 12/309,671 dated Nov. 21, 2013.

FIG. 1

| REFRESH RATE: 60Hz MODE | | | | REFRESH RATE: 40Hz MODE | |
|---|---|---|---|---|---|
| DOT CK FREQUENCY | 48 | MHz | ⇔ | 48 | MHz |
| CK COUNTER | 1290 | CK | ⇔ | 1290 | CK |
| Hsync CYCLE | 26.9 | μ sec | ⇔ | 26.9 | μ sec |
| H COUNTER | 621 | H | ⇔ | 931 | H |
| VsyncCYCLE | 16.7 | msec | ⇔ | 25.0 | msec |
| REFRESH RATE | 60 | Hz | ⇔ | 40 | Hz |

(a)

| | REFRESH RATE: 60Hz MODE | | | REFRESH RATE: 40Hz MODE | |
|---|---|---|---|---|---|
| DOT CK FREQUENCY | 48 | MHz | ⇔ | 32 | MHz |
| CK COUNTER | 1290 | CK | ⇔ | 1290 | CK |
| Hsync CYCLE | 26.9 | μsec | ⇔ | 40.3 | μsec |
| H COUNTER | 621 | H | ⇔ | 621 | H |
| VsyncCYCLE | 16.7 | msec | ⇔ | 25.0 | msec |
| REFRESH RATE | 60 | Hz | ⇔ | 40 | Hz |

REFRESH RATE : 60Hz MODE → PERIOD IN WHICH FRAME RATE SHIFTS FROM 60Hz TO 40Hz → REFRESH RATE : 40Hz MODE

| FRAME | ORDER | N | N+1 | N+2 | ··· | N+155 | ··· | M−2 | M−1 | M |
|---|---|---|---|---|---|---|---|---|---|---|
| DOT CK FREQUENCY | MHz | 48 | ← | ← | ··· | ← | ··· | ← | ← | 48 |
| CK COUNT NUMBER | CK | 1290 | ← | ← | ··· | ← | ··· | ← | ← | 1290 |
| Hsync CYCLE | μ sec | 26.9 | ← | ← | ··· | ← | ··· | ← | ← | 26.9 |
| H COUNT NUMBER | H | 621 | 622 | 623 | ··· | 776 | ··· | 929 | 930 | 931 |
| VsyncCYCLE | msec | 16.69 | 16.72 | 16.74 | ··· | 20.89 | ··· | 24.97 | 24.99 | 25.03 |
| FRAME RATE | Hz | 60.00 | 59.82 | 59.73 | ··· | 47.88 | ··· | 40.05 | 40.01 | 40.00 |

| FRAME | ORDER | N | | M (N+1) |
|---|---|---|---|---|
| DOT CK FREQUENCY | MHz | 48 | | 32 |
| CK COUNT NUMBER | CK | 1290 | | 1290 |
| Hsync CYCLE | μ sec | 26.9 | THERE IS NO SHIFT PERIOD | 40.3 |
| H COUNT NUMBER | H | 621 | | 621 |
| VsyncCYCLE | msec | 16.7 | | 25.0 |
| FRAME RATE | Hz | 60 | | 40 |

DISPLAY CONTROLLER, DISPLAY DEVICE, DISPLAY SYSTEM, AND METHOD FOR CONTROLLING DISPLAY DEVICE

CROSS-REFERENCE TO RELATED APPLICATIONS

This application is a continuation of and claims priority under 35 U.S.C. §§120/121 to U.S. patent application Ser. No. 12/309,671 filed on Jan. 27, 2009, which is a National Stage of International Application No. PCT/JP2007/056350, filed on Mar. 27, 2007, and claims the benefit of Japanese Patent Application No. 2006-209146, filed on Jul. 31, 2006. The disclosures of each of the above applications are incorporated herein by reference in their entirety.

TECHNICAL FIELD

The present invention relates to (i) a display controller for controlling a display device, (ii) a display device controlled by the display controller, (iii) a display system including the display device and the display controller, and (iv) a method for controlling the display device.

BACKGROUND ART

Conventionally, a mobile information terminal device used in a liquid crystal display device of a mobile phone or the like is driven by a buttery, so that a significant object is to reduce its power consumption. As to the reduction of power consumption of the information terminal device, a technique for decreasing a refresh rate (refresh cycle) is known. The technique for decreasing a refresh rate is described as follows with reference to drawings. Note that, the refresh rate means "how often a screen on the display is switched (updated)". In case where the refresh rate is 60 Hz, the screen is switched 60 times per second.

FIG. 20(*a*) is a timing chart illustrating the case where the refresh rate is 60 Hz. FIG. 20(*a*) shows a vertical synchronization signal (Vsync), a horizontal synchronization signal (Hsync), a dot clock (dot CK), and a video data signal (Video). Note that, a single vertical scanning period (1V) is 16.7 mS, a horizontal scanning period (1H) is 25 μS, a dot CK is 48 MHz, and 1V is 660H. The vertical scanning is carried out so as to correspond to a timing of the vertical synchronization signal, so that a frequency of the vertical synchronization signal serves as the refresh rate. In this manner, when the refresh rate is 60 Hz, the screen is switched 60 times per second, so that power consumption increases. Therefore, a technique in which the refresh rate is decreased to 40 Hz for reduction of power consumption is conventionally adopted.

FIG. 20(*b*) is a timing chart illustrating a case where the refresh rate is 40 Hz. As in FIG. 20(*a*), also FIG. 20(*b*) shows a vertical synchronization signal (Vsync), a horizontal synchronization signal (Hsync), a dot clock (dot CK), and a video data signal (Video). Note that, a single vertical scanning period (1V) is 25.0 mS, a horizontal scanning period (1H) is 38 μS, a dot CK is 32 MHz, and 1V is 660H. That is, the frequency of the dot CK is decreased and the single vertical scanning period is increased so as to decrease the refresh rate, thereby driving liquid crystal more slowly.

FIG. 21 is a graph illustrating a relationship between a refresh rate and power consumption. A vertical axis indicates power consumption [mW] and a horizontal axis indicates a refresh rate [Hz]. As shown in FIG. 21, when the refresh rate is 60 Hz, the power consumption is 452 mW. When the refresh rate is 40 Hz, the power consumption is 368 mW. In this manner, it is possible to reduce power consumption about 19%.

However, a high-speed refresh rate may be required depending on an image to be displayed. As to this case, each of Patent Document 1 and Patent Document 2 describes a technique for switching a refresh rate.

More specifically, Patent Document 2 discloses the following technique. In case of using the information terminal device as a mobile phone, a high-speed refreshing operation (operation at a refresh rate of 60 Hz) is carried out in a normal display state such as a phone-call state and a low-speed refreshing operation (operation at a refresh rate of 40 Hz) is carried out in a bare essential display state such as a standby state.

[Patent Document 1]

Japanese Unexamined Patent Publication Tokukai 2002-123234 (Publication date: Apr. 26, 2002)

[Patent Document 2]

Japanese Unexamined Patent Publication Tokukai 2002-116739 (Publication date: Apr. 19, 2002)

[Patent Document 3]

Japanese Unexamined Patent Publication Tokukaihei 10-10489 (Publication date: Jan. 16, 1998)

DISCLOSURE OF INVENTION

However, if the refresh rate is changed from a 60 Hz mode to a 40 Hz mode or the refresh rate is changed from the 40 Hz mode to the 60 Hz mode, this raises the following two problems (a) and (b).

(a) If the refresh rate is changed from 60 Hz to 40 Hz, a cycle of the horizontal synchronization signal is long (see FIG. 20(*b*)), so that the dot CK (reference clock) changes from 48 MHz to 32 MHz. If the refresh rate is changed from 40 Hz to 60 Hz, the cycle of the horizontal synchronization signal is short (see FIG. 20(*b*)), so that the dot clock changes from 32 MHz to 48 MHz.

With the change of the dot clock, noise occurs in changing the refresh rate is from the 60 Hz mode to the 40 Hz mode and in switching the mode so that the refresh rate is changed from the 40 Hz mode to the 60 Hz mode, and the noise may cause the screen to be disarranged in switching the refresh rate.

In a display system, the dot clock serves as a reference clock at which video data of each pixel is sampled, so that the dot clock is designed in many display systems on the assumption that there is no dynamic change. If the dot clock suddenly changes, an operation for sampling video data is incorrectly carried out on the side of the display device, so that the display device fails to correctly obtain the video data. As a result, the screen is disarranged at this timing.

Particularly, this phenomenon frequently occurs in case of adopting a low voltage differential signal (LVDS) mode. Note that, the LVDS is a low voltage differential signal standard which was standardized in ANSI/TIA/EIA644A. As to the differential signal, two signals are used, and if a difference between the two signals is +, this is regarded as "H", and if the difference between the two signals is −, this is regarded as "L". The differential signal is characterized by having higher resistance against noise than a single-end signal. In case of changing the refresh rate by using the LVDS, there is a change in the dot CK corresponding to a period obtained by carrying out division with a PLL circuit, so that it is impossible to carry out suitable division. Thus, the foregoing phenomenon more frequently occurs in using LVDS.

(b) Further, if the mode of the refresh rate is switched, as apparent from comparison between FIG. 20(*a*) and FIG.

20(*b*), there is a change in a single horizontal scanning period corresponding to a time taken to carry out writing into each pixel. Thus, display quality changes, which results in unnatural feeling for the user when the mode is switched. More specifically, the time taken to carry out the writing into the pixel changes, which causes pixels to be unevenly charged. For example, if the refresh rate is changed from 60 Hz to 40 Hz, the single horizontal scanning period corresponding to a cycle at which writing is carried out into the pixel changes from 25 μS to 38 μS, and a pixel which makes a display with it charged 80% becomes charged 90%, so that an image changes. Further, the charging condition does not sequentially change but suddenly changes from 90% to 80%. If the charging condition changes in a short time period, images are switched one after another. This results in unnatural feeling for the user.

Further, a power source circuit and an analog circuit are included in the display device, and each of these circuits always brings about self power loss regardless of a condition of the display device. The self power loss raises such problem that it is difficult to reduce power consumption. This problem will be solved by dependent claims.

The present invention was made in view of the foregoing problems, and a first object of the present invention is to provide a display controller, a display device, and a display system, each of which suppresses occurrence of noise also in switching the refresh rate thereby preventing a screen from being disarranged by the noise, and a second object of the present invention is to provide a display controller, a display device, a display system, and a display device control method, each of which realizes less variation in a charging rate also in switching the refresh rate and allows an image giving the user no unnatural feeling to be displayed.

In order to solve the foregoing problems, a display controller of the present invention is capable of changing a refresh rate indicative of how often a screen displayed on a display device having plural pixels is switched and generates (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, said display controller comprising a dot clock generation device to generate the dot clock whose frequency is constant without depending on a change of the refresh rate.

Further, in order to solve the foregoing problems, a method of the present invention for controlling a display device allows a change of a refresh rate indicative of how often a screen displayed on a display device having plural pixels is switched and allows generation of (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, wherein a frequency of the dot clock is made constant without depending on the change of the refresh rate.

Herein, the "dot clock" means a reference clock in accordance with which the display device samples video data for each pixel, and video data is exchanged between the pixels in synchronization with the dot clock in a video system. Generally, video data corresponding to a single pixel is in synchronization for each dot clock.

The display device has a plurality of pixels, and writing of video data into the pixels causes an image to be displayed on the screen of the display device. Further, the display controller can change a refresh rate indicative of how often a screen displayed on the display device is switched. In this manner, the refresh rate can be changed, so that it is possible to reduce power consumption by adopting not only the high refresh rate mode but also the low refresh rate mode. Further, the horizontal synchronization signal and the vertical synchronization signal are supplied to the display device, so that a single horizontal period and a single vertical period can be defined on the side of the display device. As a result, a predetermined image based on the video data can be displayed on the screen.

Particularly, according to the foregoing arrangement, there is provided the dot clock generation device to generate the dot clock (reference clock), supplied to the display device, whose frequency is constant without depending on the change of the refresh rate. Further, according to the foregoing method, the dot clock whose frequency is constant is supplied to the display device without depending on the change of the refresh rate. Thus, in case where the refresh rate is switched from the high refresh rate mode to the low refresh rate mode and in case where the refresh rate is switched from the low refresh rate mode to the high refresh rate mode, the dot clock does not change. Thus, it is possible to prevent occurrence of noise caused by the change of the dot clock and prevent disarrangement of the screen which is caused by the noise.

Further, in order to solve the foregoing problems, a display controller of the present invention is capable of changing a refresh rate indicative of how often a screen displayed on a display device having plural pixels is switched and generates (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, said display controller comprising a horizontal synchronization signal generation device to generate the horizontal synchronization signal whose cycle is constant without depending on a change of the refresh rate.

Further, in order to solve the foregoing problems, a method of the present invention for controlling a display device allows a change of a refresh rate indicative of how often a screen displayed on a display device having plural pixels is switched and allows generation of (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, wherein a cycle of the horizontal synchronization signal is made constant without depending on the change of the refresh rate.

The display device has a plurality of pixels, and writing of video data into the pixels causes an image to be displayed on the screen of the display device. Further, the display controller can change a refresh rate indicative of how often a screen displayed on the display device is switched. In this manner, the refresh rate can be changed, so that it is possible to reduce power consumption by adopting not only the high refresh rate mode but also the low refresh rate mode. Further, the horizontal synchronization signal and the vertical synchronization signal are supplied to the display device, so that a single horizontal period and a single vertical period can be defined on the side of the display device. As a result, a predetermined image based on the video data can be displayed on the screen.

The pixels are charged in accordance with the horizontal synchronization signal, so that the cycle of the horizontal synchronization signal defines uniformity with which the pixels are charged. Particularly, according to the foregoing arrangement, there is provided the horizontal synchronization signal generation device to generate the horizontal synchronization signal whose cycle is constant without depending on the refresh rate. Further, according to the foregoing method, the horizontal synchronization signal whose cycle is constant without depending on the refresh rate is supplied to the display device. Thus, in case where the refresh rate is switched from the high refresh rate mode to the low refresh rate mode and in case where the refresh rate is switched from the low refresh rate mode to the high refresh rate mode, a charging rate in the pixels less varies. Thus, the pixels are uniformly charged also in sequentially switching the refresh rate between the low refresh rate mode and the high refresh rate mode, which results no unnatural feeling for the user.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a table illustrating comparison between a case where a refresh rate is 60 Hz and a case where the refresh rate is 40 Hz in terms of a dot CK frequency, a horizontal synchronization signal, and the like, in Embodiment 1.

FIG. 20(*b*) is a timing chart showing a conventional art so as to illustrate timings of a dot clock (reference clock), a vertical synchronization signal, a horizontal synchronization signal, and video data in case where the refresh rate is 40 Hz.

REFERENCE NUMERALS, REFERENCE SIGNS

1 Display device

2 Graphic LSI (display controller)

8 Dot CK generation circuit (dot CK generation device)
9 Horizontal synchronization signal generation circuit (horizontal synchronization signal generation device)
10 Vertical synchronization generation circuit (vertical synchronization signal generation device)
30 PS control signal generation circuit (power control signal generation device)
Hsync Horizontal synchronization signal
Vsync Vertical synchronization signal

BEST MODE FOR CARRYING OUT THE INVENTION

Embodiment 1

One embodiment of the present invention is described below with reference to the attached drawings.

Figure 2:
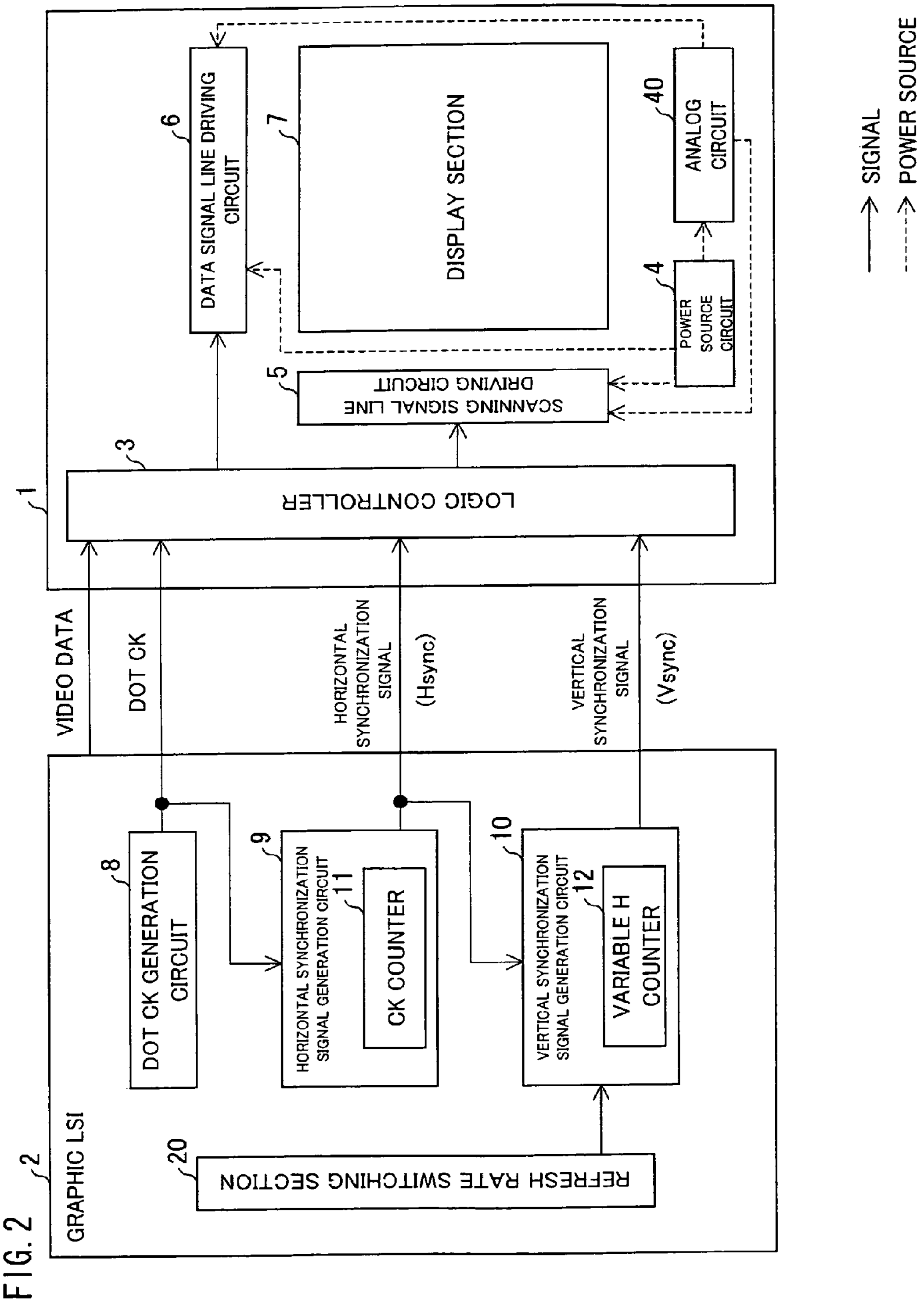
FIG. 2 is a block diagram illustrating a display system of Embodiment 1.

As illustrated in FIG. 2, a display system of the present embodiment includes a display device 1 and a graphic LSI (display controller) 2 positioned at a preceding stage of the display device 1.

The display device 1 is a liquid crystal display device for example, and includes: a logic controller (sometimes, referred to merely as "controller") 3; a power source circuit 4; a scanning signal line driving circuit 5; a data signal line driving circuit 6; a display section 7 for displaying an image; and an analog circuit 40. The power source circuit 4 serves as a driver of the logic controller 3, the scanning signal line driving circuit 5, the data signal line driving circuit 6, and the like. A dotted line of FIG. 2 shows a power supply route. As illustrated in FIG. 2, the power source circuit 4 supplies power to the scanning signal line driving circuit 5, the data signal line driving circuit 6, and the analog circuit 40. The analog circuit 40 supplies power to the scanning signal line driving circuit and the data signal line driving circuit 6. However, power does not have to be entirely supplied to all these members but may be supplied to part of the members. That is, the dotted line merely shows a range in which power can be supplied. Note that, a continuous line of FIG. 2 shows a flow of data.

The logic controller 3 serves as a controller of the display device 1. As illustrated in FIG. 2, the logic controller 3 receives a dot CK (dot clock; reference clock), a horizontal synchronization signal (Hsync), a vertical synchronization signal (Vsync), and video data. The logic controller 3 outputs the received dot CK, horizontal synchronization signal, and video data to the data signal line driving circuit 6, and outputs the dot CK and the vertical synchronization signal to the scanning signal line driving circuit 5.

In accordance with the horizontal synchronization signal, the data signal line driving circuit 6 outputs the video data to a data signal line (not shown) provided on the display section 7. Due to the video data outputted to the data signal line, a tone voltage corresponding to the video data is applied to a pixel (not shown) provided on the display section 7. In accordance with the vertical synchronization signal, the scanning signal line driving circuit 5 sequentially turns on switching elements (not shown) provided on the display section 7.

While, as illustrated in FIG. 2, the graphic LSI includes: a dot CK generation circuit (reference clock generation section; dot clock) 8; a horizontal synchronization signal generation circuit (horizontal synchronization signal generation section) 9; a vertical synchronization signal generation circuit (vertical synchronization signal generation section) 10; and a refresh rate switching section 20. Further, as illustrated in FIG. 2, the horizontal synchronization signal generation circuit 9 internally includes a CK counter 11 for counting a dot CK. While, as illustrated in FIG. 2, the vertical synchronization signal generation circuit internally includes a variable H counter (referred to also as "H counter") 12 which can count a horizontal period (H) and can change the counted number.

The dot CK generation circuit 8 generates a dot CK and sends the generated dot CK to the logic controller 3 and the horizontal synchronization signal generation circuit 9. The horizontal synchronization signal generation circuit 9 receives the dot CK from the dot CK generation circuit 8 and causes the CK counter 11 included therein to count the dot CK so as to generate a horizontal synchronization signal with a predetermined number of dots CK regarded as 1H. The horizontal synchronization signal generation circuit 9 sends the generated horizontal synchronization signal to the logic controller 3 and the vertical synchronization signal generation circuit 10.

The vertical synchronization signal generation circuit 10 receives the horizontal synchronization signal from the horizontal synchronization signal generation circuit 9 and causes the variable H counter included therein to count the horizontal synchronization signal so as to generate a vertical synchronization signal with the H count number regarded as 1V. The vertical synchronization signal generation circuit 10 sends the generated vertical synchronization signal to the logic controller 3.

The refresh rate switching section 20 switches a refresh rate (referred to also as "frame rate") between a normal refresh rate of 60 Hz (a mode of a high refresh rate) and a low refresh rate of 40 Hz (a mode of a low refresh rate). The refresh rate is switched between these modes as follows. The refresh mode is switched to the low refresh rate of 40 Hz in reducing power consumption, and the refresh rate is switched to the normal refresh rate of 60 Hz otherwise. In this manner, the mode of the low refresh rate of 40 Hz is adopted together with the mode of the normal refresh rate of 60 Hz, thereby reducing power consumption.

Particularly, in the present embodiment, the refresh rate switching section 20 inputs, to the vertical synchronization signal generation circuit 10, a first H count number variation command signal (first command signal) which is a signal for switching the H count number counted in generating the vertical synchronization signal in the case where the refresh rate is the normal refresh rate of 60 Hz and in the case where the refresh rate is the low refresh rate of 40 Hz. In accordance with the first command signal, the vertical synchronization signal generation circuit 10 determines the H count number counted in generating the vertical synchronization signal.

In accordance with the first command signal, the variable H counter 12 switches the H count number depending on whether the refresh rate is the normal refresh rate of 60 Hz or the low refresh rate of 60 Hz. Specifically, as illustrated in FIG. 1, the variable H counter 12 sets the horizontal period H to 621H (i.e., 1V=621H) in case where the refresh rate is 60 Hz, and the variable H counter 12 sets the horizontal period H to 931H (i.e., 1V=931H) in case where the refresh rate is 40 Hz. Note that, "621H" and "931H" are mere examples herein.

Further, in the present embodiment, the dot CK frequency (sometimes, referred to merely as "dot CK") generated by the dot CK generation circuit 8 is made constant regardless of whether the refresh rate is 40 Hz or 60 Hz as illustrated in FIG. 1. Note that, in FIG. 1, the dot CK frequency is 48 MHz, but it is needless to say that this value is mere an example.

Figure 3:
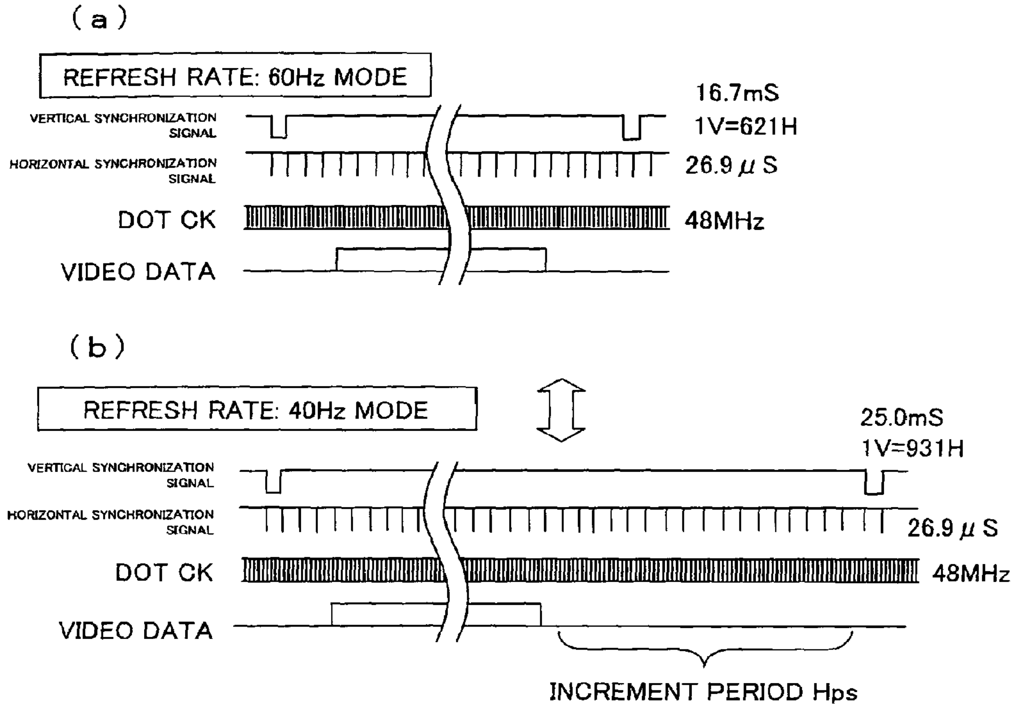
FIG. 3 shows Embodiment 1, and (a) is a timing chart illustrating timings of a dot clock (reference clock), a vertical synchronization signal, a horizontal synchronization signal, and video data in the case where the refresh rate is 60 Hz (normal refresh rate), and (b) is a timing chart illustrating timings of a dot clock (reference clock), a vertical synchronization signal, a horizontal synchronization signal in the case where the refresh rate is 40 Hz (low refresh rate).

In FIG. 3, (a) is a timing chart illustrating timings of a vertical synchronization signal, a horizontal synchronization signal, a dot clock (dot CK), and video data in case where the refresh rate is the normal refresh rate of 60 Hz. In this figure, 1V=16.7 mS (msec), 1H=26.9 μS (μsec), dot CK=48 MHz, 1V=621H.

While, (b) of FIG. 3 is a timing chart illustrating timings of a vertical synchronization signal, a horizontal synchronization signal, a dot clock (dot CK), and video data in case where the refresh rate is the low refresh rate of 40 Hz. In this figure, 1V=25.0 mS, 1H=26.9 μS, dot CK=48 MHz, 1V=931H. In (a) of FIG. 3 and (b) of FIG. 3, video data is sent to each pixel via the data signal line during a period in which the video data is active at 1V.

It is noteworthy that, in the present embodiment, (i) the dot CK at the normal refresh rate of 60 Hz and the dot CK at the low refresh rate of 40 Hz are made equal to each other, and (ii) the H count number counted by the variable H counter 12 is made variable, so that a horizontal synchronization signal frequency at the low refresh rate of 40 Hz and a horizontal synchronization signal frequency at the normal refresh rate of 60 Hz are made equal to each other. As a result, a period in which video data is active at the low refresh rate of 40 Hz and a period in which video data is active at the normal refresh rate of 60 Hz are equal to each other, so that an increment period Hps in which video data is inactive (is in a low level) can be provided at a latter half period of 1V, as illustrated in (b) of FIG. 3, in case where the refresh rate is the low refresh rate of 40 Hz.

That is, as illustrated in FIG. 1, when the refresh rate is the normal refresh rate of 60 Hz, the dot CK is 48 MHz, and the CK counted by the CK counter is 1290CK, and the Hsync cycle is 26.9 μsec, and the horizontal period H counted by the H counter is 621H, and the Vsync cycle is 16.7 msec. While, as illustrated in FIG. 1, when the refresh rate is the low refresh rate of 40 Hz, the dot CK is 48 MHz, and the CK counted by the CK counter is 1290CK, and the Hsync cycle is 26.9 μsec, and the horizontal period H counted by the H counter is 931H, and the Vsync cycle is 25.0 msec.

As described above, the dot CK is made constant in the present embodiment. Thus, in case where the refresh rate is switched from 60 Hz to 40 Hz or in case where the refresh rate is switched from 40 Hz to 60 Hz, the dot CK does not change, so that it is possible to prevent occurrence of noise caused by the change of the dot CK and prevent a screen from being disarranged by the noise. Further, also in case of adopting LVDS mode such as EMI which is excellent in signal transfer between the graphic LSI2 serving as a device main substrate and the display device 1, there is no change in a period divided by the PLL circuit used in LVDS, so that it is possible to carry out suitable division. As a result, the displayed screen is free from any noise.

Further, a cycle of a horizontal synchronization signal at the normal fresh rate of 60 Hz and a cycle of a horizontal synchronization signal at the low refresh rate of 40 Hz are made constant. Therefore, in case where the refresh rate is switched from 60 Hz to 40 Hz or in case where the refresh rate is switched from 40 Hz to 60 Hz, pixels are uniformly charged. Thus, also in case where the refresh rate is sequentially switched between the low refresh rate of 40 Hz and the normal refresh rate of 60 Hz, there is no unnatural feeling for the user. Further, the arrangement free from any unnatural feeling for the user realizes minute control.

Further, there is no variation in the horizontal synchronization period and the refresh rate can be made variable while keeping the pixel writing time constant, so that it is possible to realize an effective power saving system keeping its reliability.

That is, the graphic LSI2 of the present embodiment can change a refresh rate indicative of "how often a screen displayed on the display device 1 having plural pixels is switched" and generates (i) a dot CK which is an internal operation timing signal of the display device 1, (ii) video data indicative of an image to be displayed on the screen, (iii) a horizontal synchronization signal for defining a horizontal period in which an image is displayed on the screen, and (iv) a vertical synchronization signal for defining a vertical period in which an image is displayed on the screen, and supplies them to the display device 1. The graphic LSI2 includes a dot CK generation circuit 8 for generating a dot CK whose frequency is constant without depending on a change of the refresh rate.

Further, the graphic LSI2 of the present embodiment can change a refresh rate indicative of "how often a screen displayed on the display device 1 having plural pixels is switched" and generates (i) a dot CK which is an internal operation timing signal of the display device 1, (ii) video data indicative of an image to be displayed on the screen, (iii) a horizontal synchronization signal for defining a horizontal period in which an image is displayed on the screen, and (iv) a vertical synchronization signal for defining a vertical period in which an image is displayed on the screen, and supplies them to the display device 1. The graphic LSI2 includes a horizontal synchronization signal generation section 9 for generating a horizontal synchronization signal whose frequency is constant without depending on a change of the refresh rate.

Further, also a control method using the graphic LSI2 and the display device 1 controlled by the graphic LSI2 are included in the present embodiment.

Further, as described above, the vertical synchronization signal generation circuit 10 of the present embodiment counts a cycle of the horizontal synchronization signal so as to generate the vertical synchronization signal, and changes a count number of the cycle of the horizontal synchronization signal which is counted in generating a single vertical synchronization signal in accordance with a change of the refresh rate.

Note that, in the present embodiment, the frequency of the dot CK and the frequency of the horizontal synchronization signal are respectively kept constant without depending on the change of the refresh rate. However, the arrangement is not necessarily limited to this, and it may be so arranged that any one of them is kept constant.

Comparative Example of Embodiment 1

Figure 4:
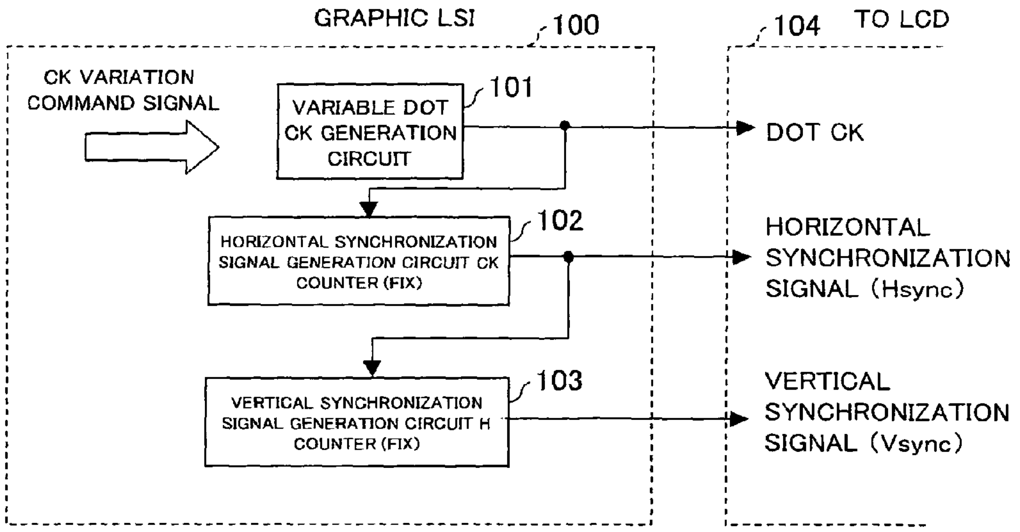
FIG. 4 is a functional block diagram illustrating a display system as a comparative example of Embodiment 1.

FIG. 4, showing a comparative example of Embodiment 1, is a functional block diagram illustrating a conventional display system. As illustrated in FIG. 4, a graphic LSI100 of a conventional display system includes a variable dot CK generation circuit 101, a horizontal synchronization signal generation circuit 102, and a vertical synchronization signal generation circuit 103. As illustrated in FIG. 4, the horizontal synchronization signal generation circuit 102 internally includes a CK counter, and the vertical synchronization signal generation circuit 103 internally includes an H counter. Further, the graphic LSI100 sends a dot CK, a horizontal synchronization signal (Hsync), and a vertical synchronization signal (Vsync) to a display device (LCD) 104.

This comparative example is different from Embodiment 1 in that: a CK variation command signal is inputted to the variable dot CK generation circuit 101, and a dot CK at an normal refresh rate of 60 Hz and a dot CK at a low refresh rate of 40 can be changed in accordance with the CK variation command signal. Further, a H-count number counted by the H counter is constant both at the low refresh rate of 40 Hz and at the normal refresh rate of 60 Hz (see FIG. 6).

Figures 5, 6:
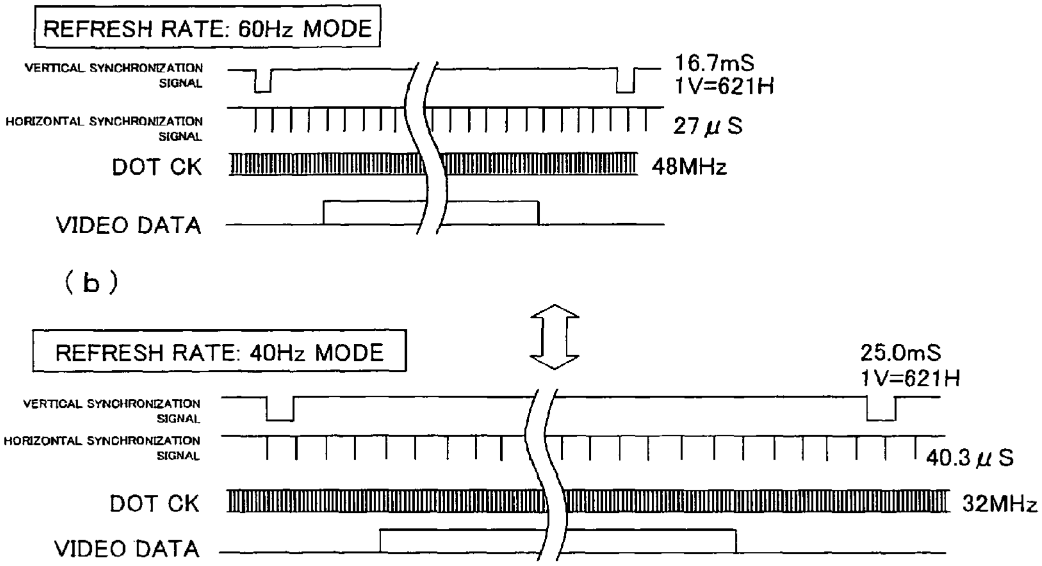
FIG. 5 shows the comparative example of Embodiment 1, and (a) is a timing chart illustrating timings of a dot clock (reference clock), a vertical synchronization signal, a horizontal synchronization signal, and video data in the case where the refresh rate is 60 Hz (normal refresh rate), and (b) is a timing chart illustrating timings of a dot clock (reference clock), a vertical synchronization signal, a horizontal synchronization signal in the case where the refresh rate is 40 Hz (low refresh rate).
FIG. 6, showing the comparative example of Embodiment 1, is a table illustrating comparison between the case where a refresh rate is 60 Hz and the case where the refresh rate is 40 Hz in terms of a dot CK frequency, a horizontal synchronization signal.

In FIG. 5, (a) and (b) are comparative examples of (a) and (b) of FIG. 3, and each of them is a conventional timing chart illustrating timings of a vertical synchronization signal, a horizontal synchronization signal, a dot clock (dot CK), and video data. (a) of FIG. 5 is a timing chart illustrating timings of a vertical synchronization signal, a horizontal synchronization signal, a dot clock (dot CK), and video data in case where the refresh rate is the normal refresh rate of 60 Hz. (b) of FIG. 5 is a timing chart illustrating timings of a vertical synchronization signal, a horizontal synchronization signal, a dot clock (dot CK), and video data in case where the refresh rate is the low refresh rate of 40 Hz. In (a) of FIG. 5, dot CK=48 MHz, 1V=16.7 mS, 1H=27 μS, 1V=621H. In (b) of FIG. 5, dot CK=32 MHz, 1V=25.0 mS, 1H=40.3 μS, 1V=621H.

That is, as apparent from (a) of FIG. 5 and (b) of FIG. 5, the comparative example is different from Embodiment 1 in that: the dot Ck at the normal refresh rate of 60 Hz and the dot Ck at the low refresh rate of 40 Hz are different from each other, and the H count number counted by the H counter is made constant, so that the cycle of the horizontal synchronization signal at the refresh rate of 40 Hz and the cycle of the horizontal synchronization signal at the normal refresh rate of 60 Hz are made different. Thus, a period in which video data is active at the low refresh rate of 40 Hz is longer than a period in which video data is active at the normal refresh rate of 60 Hz, so that an increment period does not occur unlike Embodiment 1. That is, as illustrated in (b) of FIG. 5, the period in which video data is active at the low refresh rate of 40 Hz elongates.

Specifically, as illustrated in FIG. 6, in case where the refresh rate is the normal refresh rate of 60 Hz, the dot CK is 48 MHz, and the CK-count number counted by the CK counter is 1290CK, and the Hsync cycle is 26.9 μS, and the H count number counted by the H counter is 621H, and Vsync cycle is 16.7 sec. While, as illustrated in FIG. 6, in case where the refresh rate is the low refresh rate of 40 Hz, the dot CK frequency is 32 MHz, and the CK-count number counted by the CK counter is 1290CK, and the Hsync cycle is 40.3 μS, and the H count number counted by the H counter is 621H, and the Vsync cycle is 25.0 msec.

Thus, in this comparative example, when the refresh rate is switched from 60 Hz to 40 Hz or when the refresh rate is switched from 40 Hz to 60 Hz, variation of the dot CK results in occurrence of noise, and the noise accordingly causes a screen to be disarranged. Further, the cycle of the horizontal synchronization signal at the normal refresh rate of 60 Hz and the cycle of the horizontal synchronization signal at the low refresh rate of 40 Hz are different from each other, so that pixels are unevenly charged. Thus, in case of sequentially switching the refresh rate between 40 Hz and 60 Hz, there is unnatural feeling for the user. Further, if the refresh rate is sequentially switched between 40 Hz and 60 Hz, the dot CK changes. Thus, in case where LDVS is adopted, a period in which division should be carried out by the PLL circuit changes. This results in such disadvantage that it is impossible to follow the change and accordingly it is impossible to carry out suitable division.

Embodiment 2

Another embodiment of the present invention is described below with reference to the attached drawings. The present embodiment describes differences from Embodiment 1. Thus, for convenience for description, the same reference numerals are given to members having the same functions as those of Embodiment 1, and descriptions thereof are omitted.

In Embodiment 1, the first command signal is inputted to the variable H counter 12, and in accordance with the first command signal, the H count number counted by the variable H counter 12 is set to 621 in case where the refresh rate is the normal refresh rate of 60 Hz and the H count number counted by the variable H counter 12 is set to 931 in case where the refresh rate is the low refresh rate of 40 Hz.

In the present embodiment, the variable H counter 12 receives a second H count number variation command signal (second command signal) for giving an instruction to increase the H count number counted by the variable H counter 12 in increments of 1H in every single frame (every 1V) in case of switching the refresh rate from 60 Hz to 40 Hz. That is, at the time of switch from the normal refresh rate of 60 Hz shown in (a) of FIG. 7 into the low refresh rate of 40 Hz shown in (b) of FIG. 7, the increment period Hps is increased in increments of 1H. That is, the state is not drastically changed from the state shown in (a) of FIG. 7 to the state shown in (b) of FIG. 7, but a shift period is provided between the period shown in (a) of FIG. 7 and (b) of FIG. 7 so that the increment period Hps is gradually increased in increments of 1H. Note that, the present embodiment is characterized in the shift period from the state shown in (a) of FIG. 7 into the state shown in (b) of FIG. 7, so that the state shown in (a) of FIG. 7 corresponds to the state shown in (b) of FIG. 7 and the state shown in (a) of FIG. 3 corresponds to the state shown in (b) of FIG. 3. Thus, descriptions of the states respectively shown in (a) of FIG. 7 and (b) of FIG. 7 are omitted here.

Figures 7, 8:
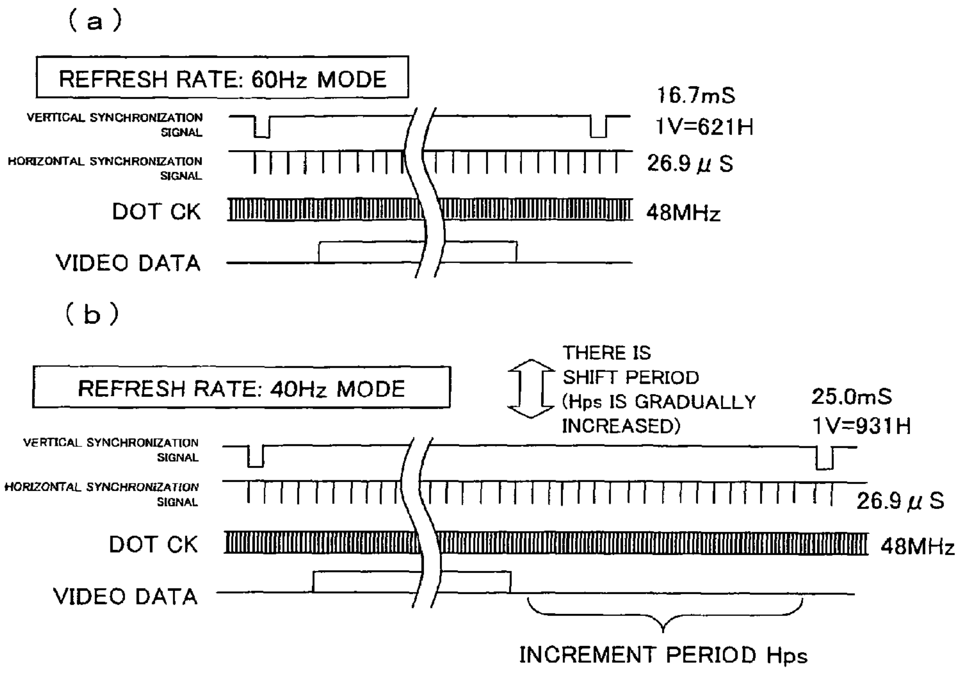
FIG. 7 shows Embodiment 2, and (a) is a timing chart illustrating timings of a dot clock (reference clock), a vertical synchronization signal, a horizontal synchronization signal, and video data in the case where the refresh rate is 60 Hz (normal refresh rate), and (b) is a timing chart illustrating timings of a dot clock (reference clock), a vertical synchronization signal, a horizontal synchronization signal in the case where the refresh rate is 40 Hz (low refresh rate).
FIG. 8 is a table illustrating a dot CK frequency, a horizontal synchronization signal, and the like in case where the refresh rate of Embodiment 2 shifts from 60 Hz to 40 Hz.

Inversely, in case of shifting the refresh rate from 40 Hz to 60 Hz, that is, in case of shifting from the state shown in (b) of FIG. 7 into the state shown in (a) of FIG. 7, the second command signal indicative of an instruction to reduce the H count number counted by the variable H counter 12 in decrements of 1H in each single frame. That is, the second command signal instructs the variable H counter 12 to increase/decrease the count number of 1H in accordance with whether to shift the refresh rate from 40 Hz to 60 Hz or to shift the refresh rate from 60 Hz to 40 Hz.

Next, with reference to FIG. 8, the following details, as an example, the case of shifting the refresh rate from the normal refresh rate of 60 Hz to the low refresh rate of 40 Hz. Assuming that N<M (each of N and M represents a frame number) for example, when an H of an N-th frame is 621H as illustrated in FIG. 8, an H of an N+1 th frame is 622H, and an H of an N+2 th frame is 623H, and an H of an M−2 th frame is 929H, and an H of an M−1 th frame is 930H, and an H of an M-th frame is 931H. That is, in case of switching the refresh rate from 60 Hz to 40 Hz, the H count number is increased in increments of 1H instead of drastically increasing 621H to 931H. As a result, the H count number increases for each frame, so that the vertical synchronization signal becomes long. When the refresh rate becomes 40 Hz lastly, increase of the H count number is stopped.

As described above, the number that the variable H counter counts for 1H is increased or decreased in increments or in decrements of 1H, that is, the increment period Hps is increased or decreased in increments or in decrements of 1H, thereby preventing a sudden change of power. In case where power suddenly changes, a voltage drops, which results in occurrence of ripples. This has a bad influence on the power source circuit. According to the present embodiment, it is possible to prevent such a bad influence.

That is, in the graphic LSI of the present embodiment, the vertical synchronization signal generation circuit 10 allows the cycle of the horizontal synchronization signal to be changed by stages in accordance with a change of the refresh rate.

Note that, in the foregoing descriptions, the number that the variable H counter counts for 1H is increased or decreased in increments or in decrements of 1H, but the arrangement is not limited to this, and it may be so arranged in increments or in decrements of 2H, 3H, or more. Further, it may be so arranged that each increment or decrement corresponds to 2 frames, 3 frames, or more frames, without being limited to 1 frame. That is, the change by stages may be carried out in every several frames.

Comparative Example of Embodiment 2

Figure 9:
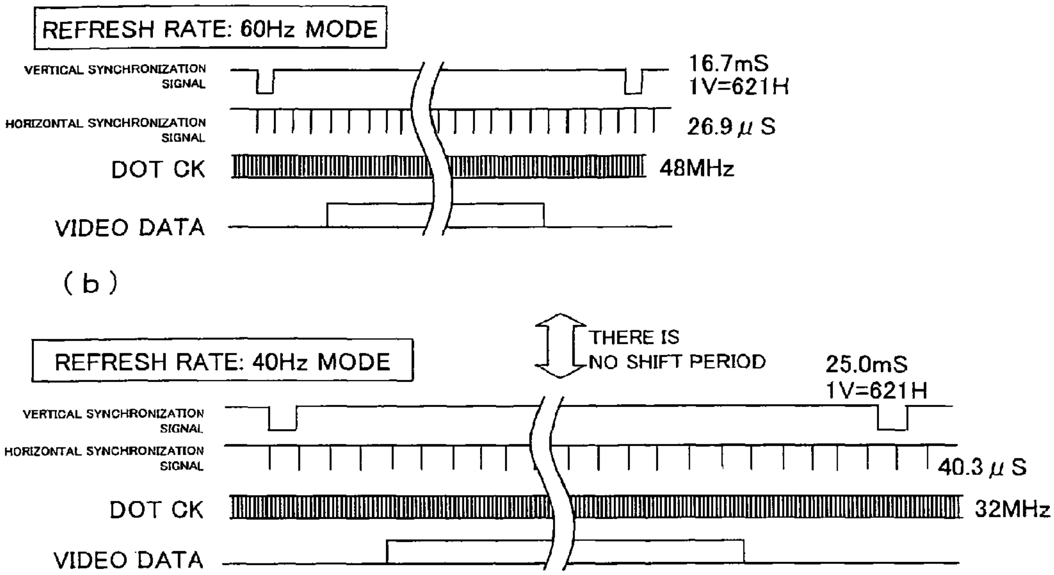
FIG. 9 shows a comparative example of Embodiment 2, and (a) is a timing chart illustrating timings of a dot clock (reference clock), a vertical synchronization signal, a horizontal synchronization signal, and video data in the case where the refresh rate is 60 Hz (normal refresh rate), and (b) is a timing chart illustrating timings of a dot clock (reference clock), a vertical synchronization signal, a horizontal synchronization signal in the case where the refresh rate is 40 Hz (low refresh rate).

In FIG. 9, (a) and (b) are comparative examples of (a) and (b) of FIG. 7 of Embodiment 2. (a) of FIG. 9 is a timing chart illustrating timings of a dot clock (dot CK), a vertical synchronization signal, a horizontal synchronization signal, and video data in case where the refresh rate is the normal refresh rate of 60 Hz. (b) of FIG. 9 is a timing chart illustrating timings of a dot clock (dot CK), a vertical synchronization signal, a horizontal synchronization signal, and video data in case where the refresh rate is the low refresh rate of 40 Hz. In this comparative example, there is no increment period Hps unlike the present embodiment. Thus, as illustrated in (a) of FIG. 9 and (b) of FIG. 9, the shift period is not provided unlike Embodiment 2 in switching the refresh rate.

Figure 10:
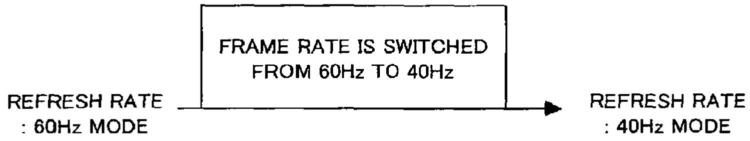
FIG. 10, showing the comparative example of Embodiment 2, is a table illustrating a dot CK frequency, a horizontal synchronization signal, and the like in case where the refresh rate shifts from 60 Hz to 40 Hz.

Therefore, in case where N<M as illustrated in FIG. 10, M is equal to N+1 in switching the refresh rate from a refresh rate at 60 Hz of the N-th frame to a refresh rate of 40 Hz of the M-th frame.

Thus, in switching the refresh rate between the normal refresh rate of 60 Hz and the low refresh rate of 40 Hz, power suddenly changes, so that a voltage drops, which results in occurrence of ripples. This has a bad influence on the power source circuit.

Embodiment 3

Still another embodiment of the present invention is described below with reference to the attached drawings. The present embodiment describes differences from Embodiments 1 and 2. Thus, for convenience in description, the same reference numerals are given to members having the same functions as those of Embodiments 1 and 2, and descriptions thereof are omitted.

Before describing the present embodiment, the following describes a problem to be solved by Embodiment 3. Generally, a significant object of a display device is to reduce its power consumption. Particularly, a mobile information terminal device is driven by a buttery, so that it is necessary to save power of the display device.

Figure 11:
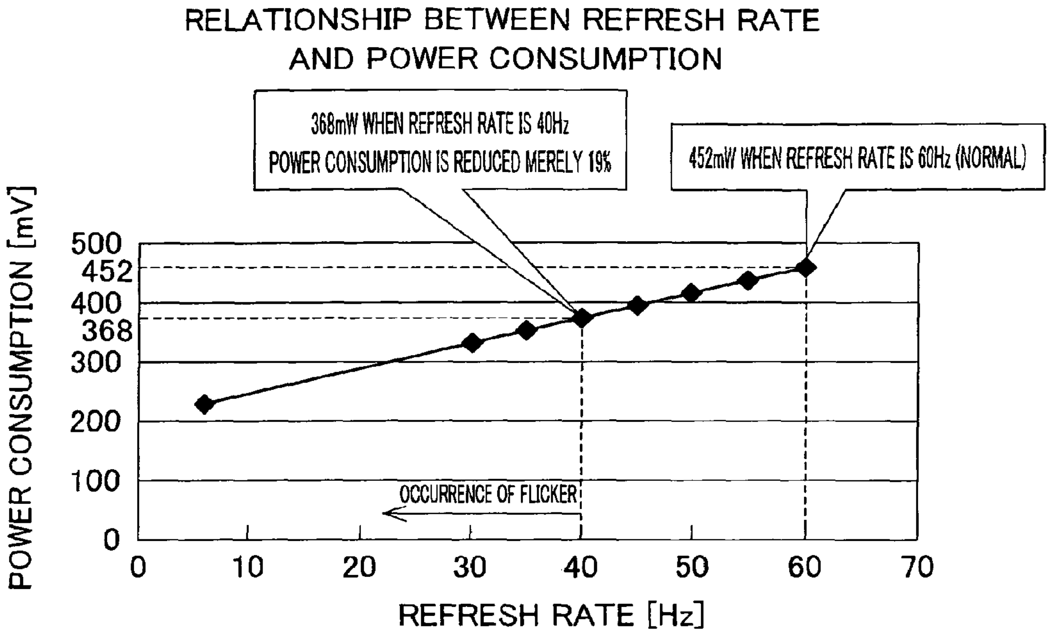
FIG. 11, illustrating an object of Embodiment 3, is a graph showing a relationship between a refresh rate and power consumption in a conventional arrangement.

Thus, the refresh rate is switched from 60 Hz to 40 Hz, thereby reducing power consumption. However, also in case where the refresh rate is switched from 60 Hz to 40 Hz, power consumption can be reduced from 452 mW to at most 368 mW as illustrated in FIG. 11, that is, the reduction of power consumption is merely 19%. Further, in case where the refresh rate is made lower than 40 Hz, this results in occurrence of flicker. Thus, the refresh rate cannot be made lower than 40 Hz.

Further, power consumption (W) of the display device 1 is expressed as follows.

Figure 12:
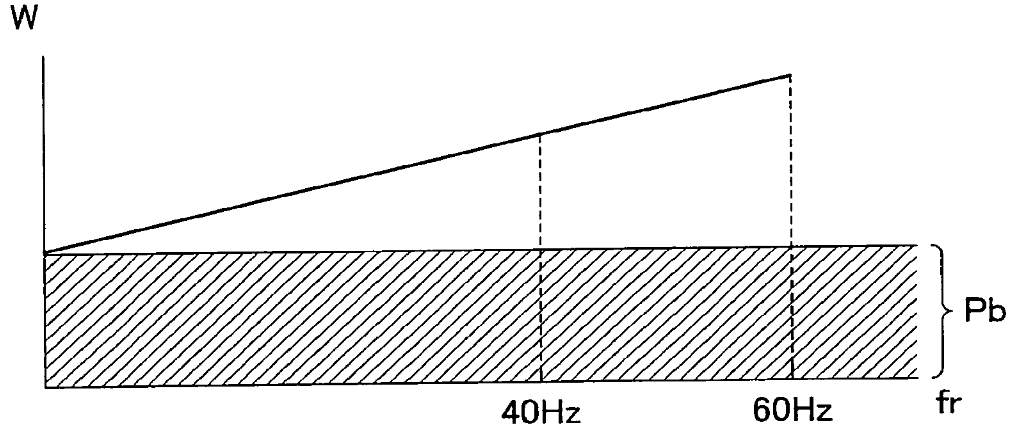
FIG. 12, illustrating self power consumption of Embodiment 3, is a graph showing a relationship between power consumption and a refresh rate in a conventional arrangement.

$W=px\cdot fr+Pb$ (px; constant number, fr; refresh rate, Pb; self power loss) (Note that, it is needless to say that values of "px" and "Pb" may vary depending on specifications (resolution, image size, power source circuit, analog circuit, and the like) of the display device). As illustrated in FIG. 12, the power consumption includes self power loss indicated by Pb (shaded area in FIG. 12) regardless of the refresh rate. Herein, the self power loss Pb means power which is lost with no member driven. For example, the self power loss Pb occurs in the power source circuit 4, the analog circuit 40, the scanning signal line driving circuit 5, and the data signal line driving circuit 6 (see FIG. 2). That is, $px\cdot fr$ indicates power which varies in accordance with the refresh rate, and Pb indicates power which is not dependent on the refresh rate. There is the power which is not dependent on the refresh rate, so that this results raises such problem that power cannot be greatly decreased even no matter how the refresh rate is decreased. Note that, though not shown, examples of the analog circuit are an amplification circuit, a decoding circuit, and the like, which are included in the power source circuit 4, the logic controller 3, the scanning signal line driving circuit 5, and the data signal line driving circuit 6.

Figure 13:
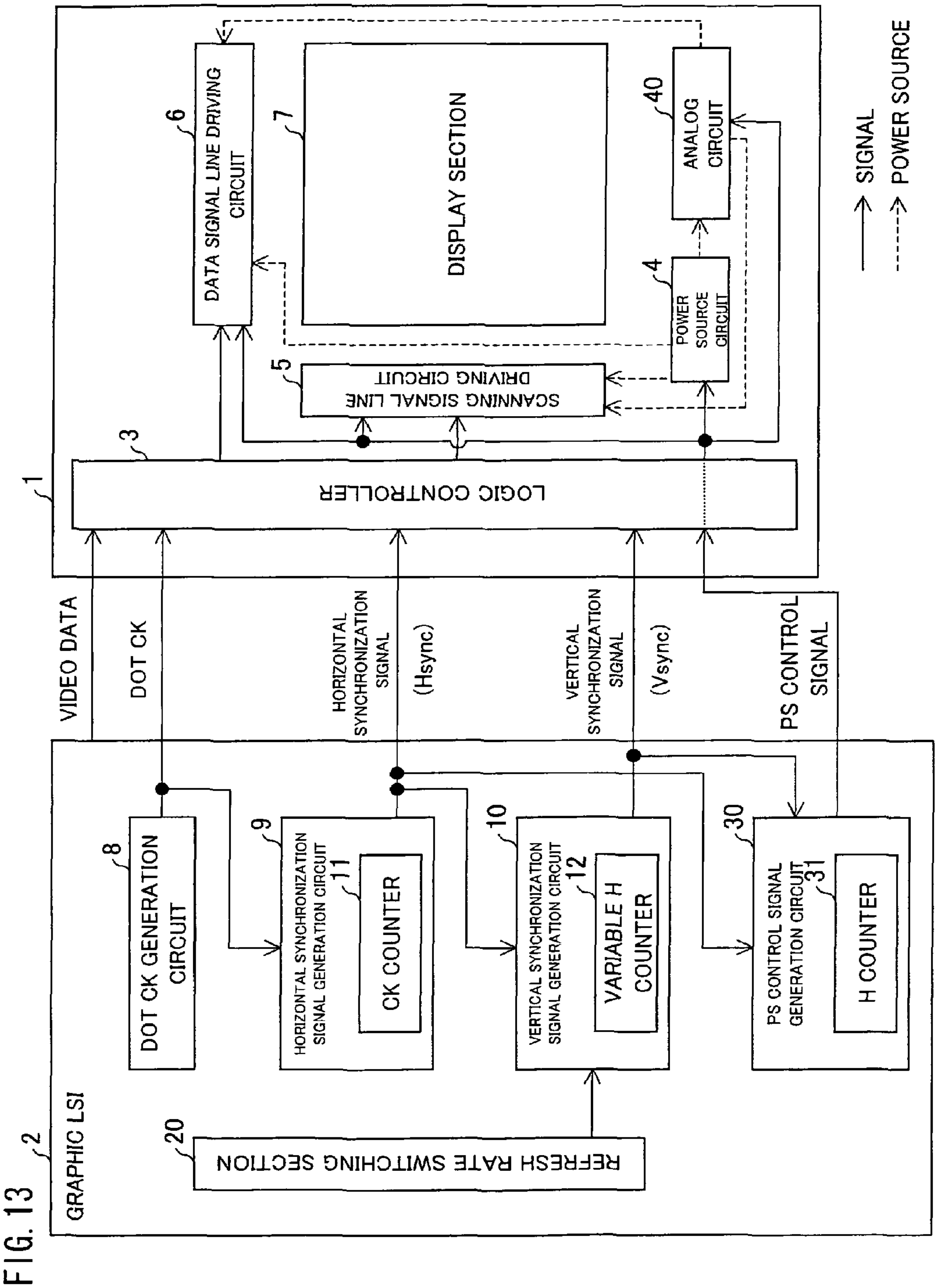
FIG. 13 is a block diagram illustrating a display system of Embodiment 3.

On the other hand, Embodiment 3 is different from Embodiment 1 in that a PS (power save) control signal (referred to also as "power control signal") generation circuit 30, as illustrated in FIG. 13, besides the graphic LSI2. As illustrated in FIG. 13, the PS control signal generation circuit 30 receives a horizontal synchronization signal from the horizontal synchronization signal generation circuit 9 and receives a vertical synchronization signal from the vertical synchronization signal generation circuit 10. The PS control signal generation circuit 30 includes an H counter 31 so as to count a horizontal period H. Further, the H count number counted by the H counter 31 is reset in accordance with the vertical synchronization signal inputted to the PS control signal generation circuit 30. Further, the PS control signal generation circuit 30 generates a PS control signal for turning ON/OFF power (self power loss Pb) of the power source circuit 4, the analog circuit, the scanning signal line driving circuit 5, and the data signal line driving circuit 6 of the display device and outputs the thus generated PS control signal to the scanning signal line driving circuit 5, the data signal line driving circuit 6, and the analog circuit 40. Note that, as described herein, the PS control signal may be outputted directly to the scanning signal line driving circuit 5, the data signal line driving circuit 6, and the analog circuit 40, or may be outputted to them via the logic controller 3.

Figure 14:
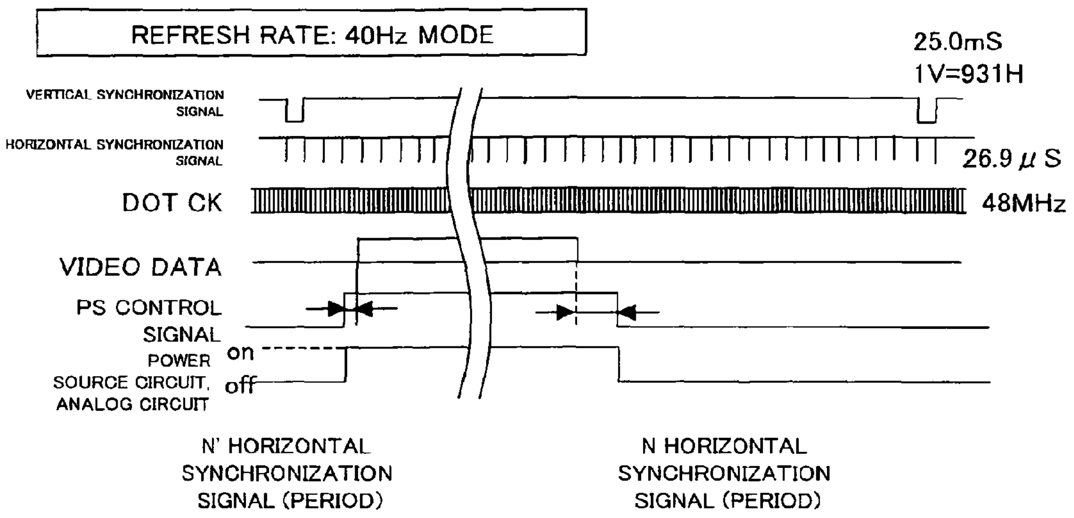
FIG. 14, showing Embodiment 3, is a timing chart illustrating timings of a dot clock (reference clock), a vertical synchronization signal, a horizontal synchronization signal, video data, and ON/OFF conditions of a power source circuit and an analog circuit in case where a refresh rate is 40 Hz (low refresh rate).

FIG. 14 is a timing chart illustrating timings of a dot clock (dot CK), a vertical synchronization signal, a horizontal synchronization signal, video data, a PS control signal, and display device power in case where the refresh rate is the low refresh rate of 40 Hz. Herein, the display device power means the aforementioned self power loss Pb.

As illustrated in FIG. 14, the logic controller 3 having received the PS control signal turns ON the power source (self power loss Pb) of the power source circuit 4, the analog circuit, the scanning signal line driving circuit 5, and the data signal line driving circuit 6 of the display device when the PS control signal is at a high level, and the logic controller 3 turns OFF the power source (self power loss Pb) of the power source circuit 4, the analog circuit, the scanning signal line driving circuit 5, and the data signal line driving circuit 6 of the display device when the PS control signal is at a low level.

As illustrated in FIG. 14, a high period (high level period) of the PS control signal includes a period in which video data is active. The PS control signal becomes at a high level during a period slightly longer than the included period, and the PS control signal becomes at a low level during a period other than this period (i.e., during a period including a large part of the increment period Hps). Note that, in FIG. 14, waveforms of other signals are the same as in Embodiments 1 and 2, so that descriptions thereof are omitted.

In more detail, the PS control signal is reset in response to an input of the vertical synchronization signal and becomes at a high level before a start point where the video data comes to be active so that the start point comes after a period which is so sufficiently long as to prepare for application of the video data onto the pixel (N' horizontal synchronization period illustrated in FIG. 14; (1×N') H), and the level of the PS control signal changes from the high level to a low level when the application of the video data onto the pixel is completed. When the application of the video data onto the pixel is completed, as illustrated in FIG. 14, the PS control signal becomes at a low level after an end point of the period in which the video data is active so that the end point comes after an N horizontal synchronization period ((1×N) H) passes.

That is, the power source circuit, the analog circuit, the scanning signal line driving circuit, and the data signal line driving circuit of the display device are stopped in a single vertical period (1V). This makes it possible to reduce the self power loss Pb to substantially 0 during a period in which the PS control signal is at a low level.

Figure 15:
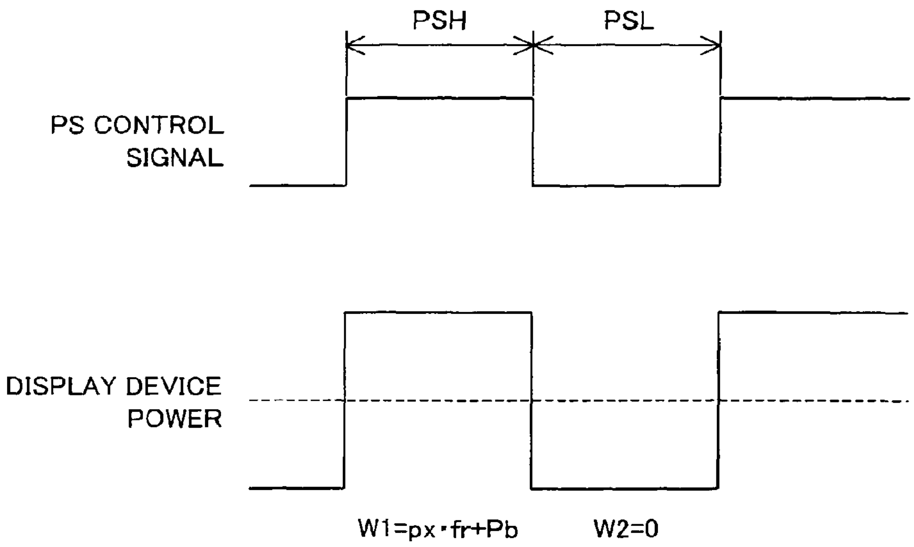
FIG. 15, showing Embodiment 3, is a timing chart illustrating a PS control signal and display device power of FIG. 14.

FIG. 15 is a timing chart illustrating timings of the PS control signal and the display device power of FIG. 14. Herein, a period in which the PS control signal is at a high level is indicated as "PHS" and a period in which the PS control signal is at a low level is indicated as "PSL". The display device power (W1) in the PSH period is expressed as follows.

$$W1=px\cdot fr+Pb$$

The display device power (W2) in the PSL period is expressed as follows.

$$W2=0$$

Thus, average display device power W in 1V is expressed as follows.

$$W=(W1\cdot PSH+W2\cdot PSL)/(PSH+PSL)$$

Figure 16:
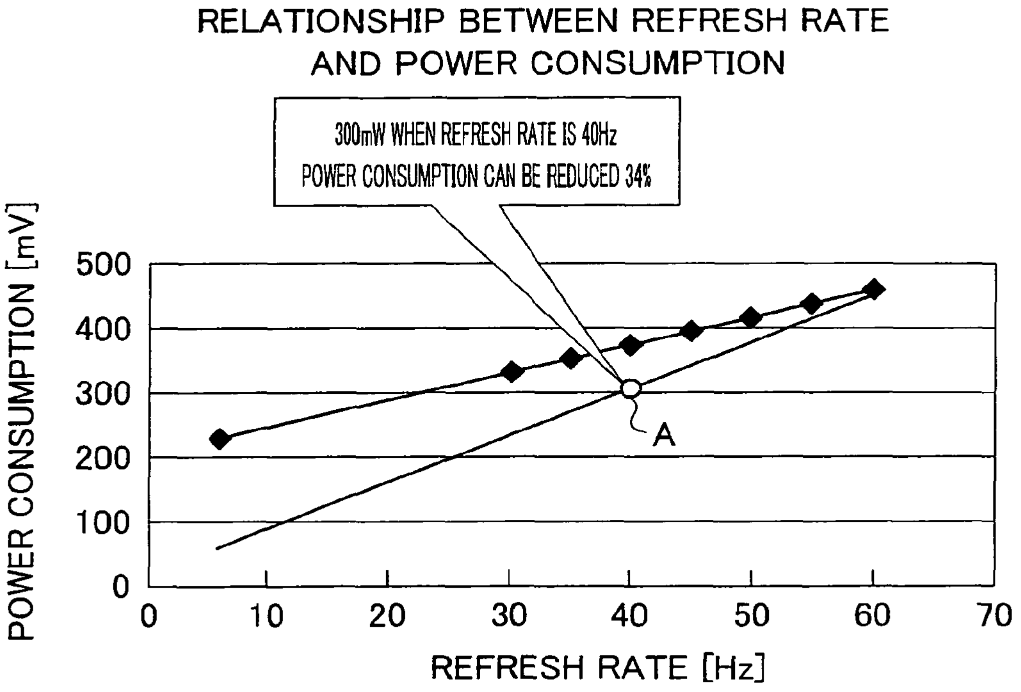
FIG. 16 is a graph illustrating a relationship between a refresh rate and power consumption in case where Embodiment 3 is applied.

Thus, the power consumption is in a state indicated by a bold line of FIG. 16, and in case where the refresh rate is set to 40 Hz, the power consumption is 300 mW at an "A" point of the bold line. In this way, it is possible to reduce the power consumption 34% compared with the case where the refresh rate is set to 40 Hz in accordance with the conventional arrangement. Note that, a thin line of FIG. 16 indicates a relationship between the power consumption and the refresh rate in the conventional arrangement.

That is, the graphic LSI2 of the present embodiment includes a PS control signal generation circuit 30 for generating a power control signal which controls ON/OFF of circuits (power source circuit 4, analog circuit 40) included in the display device 1, and the PS control signal generation circuit 30 uses the PS control signal so as to cause the circuits included in the display device 1 to be OFF at least in part of a period in which video data is not supplied to the display device 1.

In the graphic LSI2 of the present embodiment, the PS control signal generation circuit 30 further uses the PS control signal so as to cause the circuits to be ON at the time when preparation for application of video data onto the pixel starts and cause the circuits having been ON to be OFF at the time when the application of the video data onto the pixel is completed.

Note that, in the foregoing descriptions, the PS control signal is made at a high level before a start point of the period in which the video data comes to be active so that the start point comes after the N'(H) period passes and the PS control signal is made at a low level after a start point of the period in which the video signal is OFF so that the start point comes after the N(H) period passes. However, both the operation does not have to be performed but either of both the operation may be performed.

Figure 17:
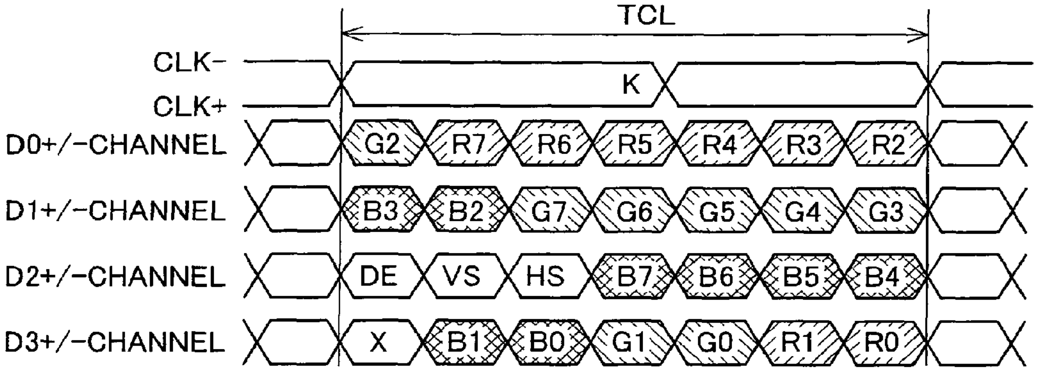
FIG. 17 is a diagram illustrating a communication protocol in conventional LVDS.

Further, in case of transmitting the PS control signal from the graphic LSI2 to the logic controller 3, another signal line is required between the graphic LSI2 and the logic controller 3. On the other hand, in case of adopting LVDS for example, as illustrated in FIG. 17, 28 data sets are embedded in a temporal axis. More specifically, in a pair of RGB, 24 data sets, i.e., "R0·G0·B0" to "R7·G7·B7" and three data sets, i.e., HS, VS, and DE, are embedded. A signal line for data indicated as "X" in FIG. 17 remains. This remaining signal line is used to transmit the PS control signal.

That is, as to the graphic LSI2 of the present embodiment, in case of supplying the dot CK, the video data, the horizontal synchronization signal, and the vertical synchronization signal to the display device 1 in accordance with a differential transfer mode, the PS control signal is embedded in a signal line used in the differential transfer method.

Note that, whether the present embodiment is adopted or not can be confirmed by observing a waveform of the PS control signal of the graphic chip.

Figure 18:
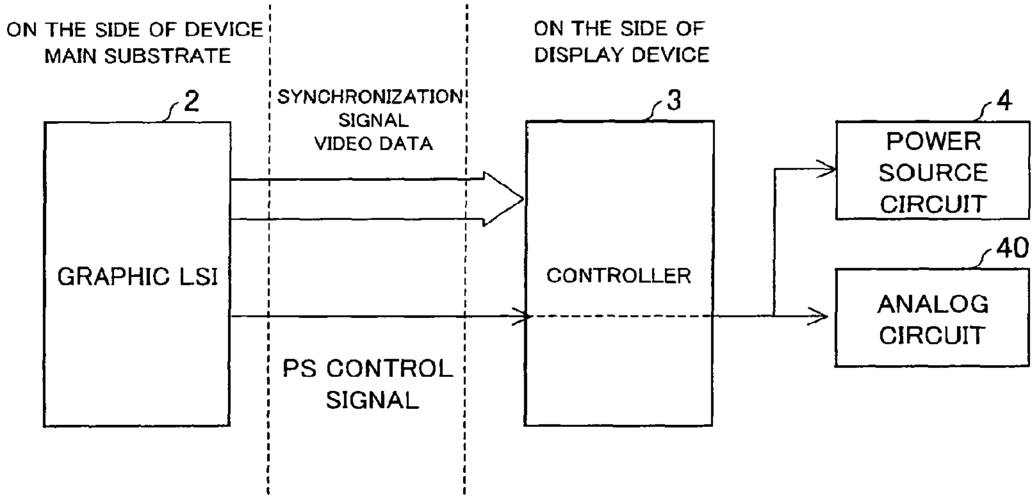
FIG. 18 is a schematic illustrating a display system of Embodiment 3.

Further, FIG. 18 schematically illustrates the display system of the present embodiment. The graphic LSI2 on the side of the device main substrate supplies not only the synchronization video data (horizontal synchronization signal, vertical synchronization signal, and video data) but also the PS control signal to the logic controller on the side of the display device substrate. Further, the logic controller 3 transmits the signal to the power source circuit 4 and the analog circuit 40, and the power source circuit 4 and the analog circuit 40 become OFF in case where the PS control signal is at a low level. Note that, both the power source circuit 4 and the analog circuit 40 do not have to be controlled, and it may be so arranged that either the power source circuit 4 or the analog circuit 40 is controlled. Further, in the present embodiment, the PS control signal causes the power source circuit 4, the analog circuit 40, the scanning signal line driving circuit 5, and the like of the display device to be controlled via the logic controller 3, but it may be so arranged that these circuits are directly controlled without the logic controller 3.

Comparative Example of Embodiment 3

Figure 19:
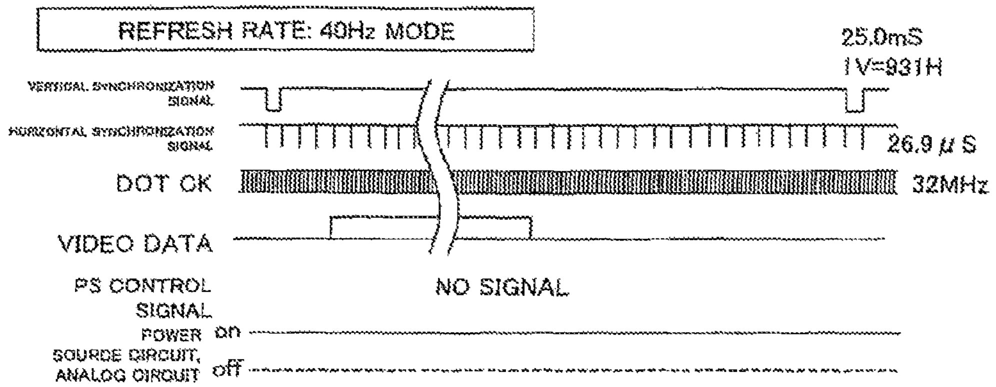
FIG. 19, showing a comparative example of Embodiment 3, is a timing chart illustrating timings of a dot clock (reference clock), a vertical synchronization signal, a horizontal synchronization signal, video data, and ON/OFF conditions of a power source circuit and an analog circuit in case where a refresh rate is 40 Hz (low refresh rate).
Figure 20A:
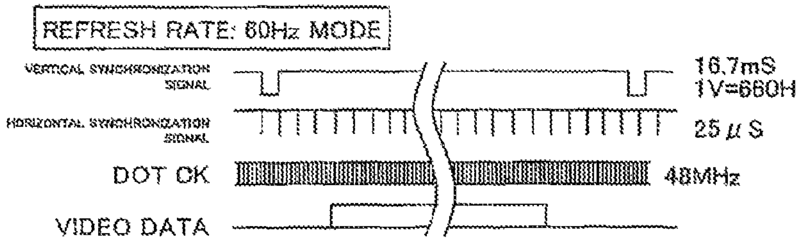
FIG. 20(a) PRIOR ART
FIG. 20(*a*) is a timing chart showing a conventional art so as to illustrate timings of a dot clock (reference clock), a vertical synchronization signal, a horizontal synchronization signal, and video data in case where the refresh rate is 60 Hz.
Figure 20B:
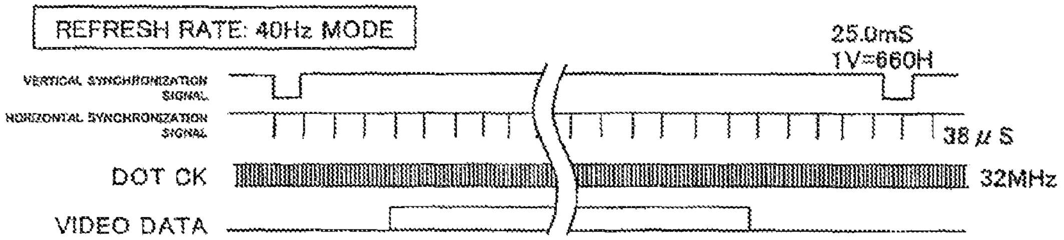
FIG. 20(b) PRIOR ART
Figure 21:
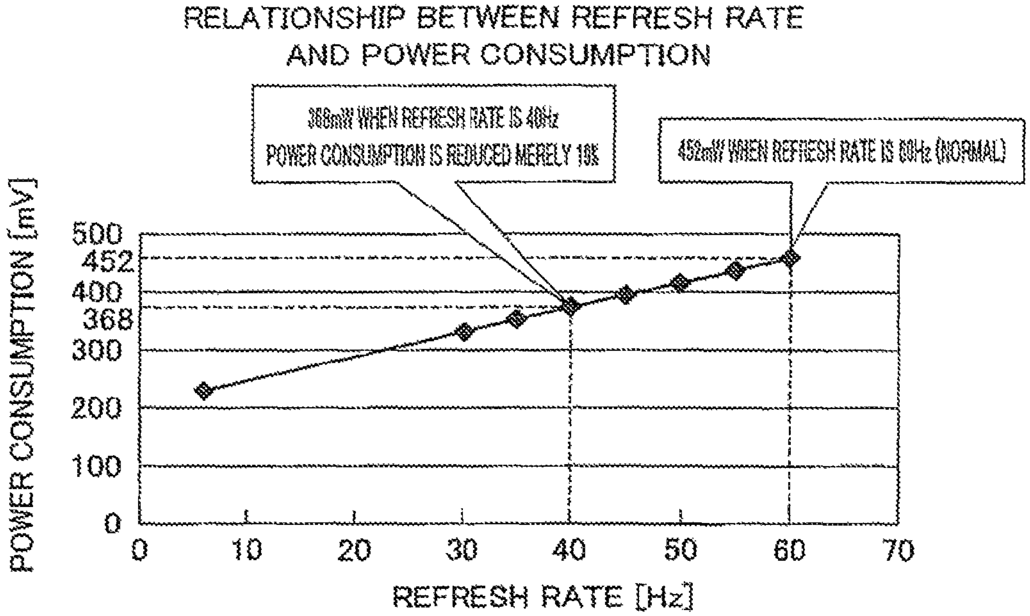
FIG. 21 PRIOR ART
FIG. 21, showing a conventional art, is a graph illustrating a relationship between a refresh rate and power consumption.

FIG. 19 illustrates a comparative example of the waveform diagram illustrated in FIG. 14 of Embodiment 3. As in FIG. 14, FIG. 19 illustrates a case where the refresh rate is a low refresh rate of 40 Hz. As illustrated in FIG. 18, the comparative example shows no PS control signal unlike Embodiment 3. Thus, the display device power (self power loss Pb) is always consumed, so that it is impossible to reduce power consumption.

Further, it may be so arranged that: the refresh rate is set to 60 Hz in case where an image displayed on the display panel is a moving image, and the refresh rate is set to 40 Hz in case where the image displayed on the display panel is a still image. That is, the refresh rate may be changeable in accordance with an image content item displayed on the display panel. Note that, such changing device (not shown) can be incorporated into the graphic LSI2.

In the present invention, explanations are given on the assumption that a predetermined resolution is adopted, that is, WSVGA (1024×RGB×600) is adopted, but other resolution may be adopted.

Further, in Embodiments 1 to 3, the dot clock is fixed, but this description means that switching of the refresh rate does not cause the dot clock to change. For example, it may be so arranged that the dot clock is changeable on the side of the graphic LSI depending on a resolution of the module.

Further, (i) the display system having the graphic LSI2 and the display device 1 and (ii) the display device 1 controlled by the graphic LSI2 are included in each of the aforementioned embodiments.

Further, it is preferable to arrange the display controller of the present invention so as to include a horizontal synchronization signal generation device which receives the dot clock from the dot clock generation device and counts the dot clock so as to generate the horizontal synchronization signal, wherein the horizontal synchronization signal generation device fixes a count number of the dot clock, which is counted in generating a single horizontal synchronization signal, without depending on the change of the refresh rate.

Further, it is preferable to arrange the method of the present invention for controlling a display device so that: the dot clock is counted so as to generate the horizontal synchronization signal, and a count number of the dot clock, which is counted in generating a single horizontal synchronization signal, is fixed without depending on the change of the refresh rate.

According to the foregoing arrangement, a count number of the dot clock, which is counted in generating a single horizontal synchronization signal, is fixed without depending on the change of the refresh rate. Thus, the cycle of the horizontal synchronization signal is constant without depending on the change of the refresh rate. As a result, in case where the refresh rate is switched from the high refresh rate mode to the low refresh rate mode and in case where the refresh rate is switched from the lower refresh rate mode to the high refresh rate mode, the pixels are uniformly charged. Therefore, also in case where the refresh rate is sequentially switched between the low refresh rate mode and the high refresh rate mode, this does not result in unnatural feeling for the user.

Further, it is preferable to arrange the display controller of the present invention so as to further comprise a vertical synchronization signal generation device which counts a cycle of the horizontal synchronization signal so as to generate the vertical synchronization signal, wherein the vertical synchronization signal generation device changes a count number the cycle of the horizontal synchronization signal, which is counted in generating a single vertical synchronization signal, in accordance with the change of the refresh rate.

Further, it is preferable to arrange the method of the present invention for controlling a display device so that: a cycle of the horizontal synchronization signal is counted so as to generate the vertical synchronization signal, and a count number of the cycle of the horizontal synchronization signal, which is counted in generating a single vertical synchronization signal, is changed in accordance with the change of the refresh rate.

According to the foregoing arrangement, the refresh rate can be changed while the dot clock is made constant, and the refresh rate can be changed while the cycle of the horizontal synchronization signal is made constant.

Further, it is preferable to arrange the display controller of the present invention so that the vertical synchronization signal generation device changes, by stages, the count number of the cycle of the horizontal synchronization signal in accordance with the change of the refresh rate.

Further, it is preferable to arrange the method of the present invention for controlling a display device so that a count number of the cycle of the horizontal synchronization signal is changed by stages in accordance with the change of the refresh rate.

According to the foregoing arrangement, the vertical synchronization signal generation device changes, by stages, the count number of the cycle of the horizontal synchronization signal in accordance with the change of the refresh rate. That is, the count number of the cycle of the horizontal synchronization signal is changed by stages so as to gradually increase or decrease the cycle of the vertical synchronization signal. More specifically, the cycle of the vertical synchronization signal is gradually increased in switching the refresh rate from the high refresh rate mode to the low refresh rate mode, and the cycle of the vertical synchronization signal is gradually decreased in switching the refresh rate from the low refresh rate mode to high low refresh rate mode. Thus, it is possible to avoid a sudden change of power which is caused in switching the refresh rate from the high refresh rate mode to the low refresh rate mode. The sudden change of power causes a voltage to drop, which results in ripples. The foregoing arrangement makes it possible to prevent a bad influence caused by the ripples.

Further, it is preferable to arrange the display controller of the present invention so that the cycle of the horizontal synchronization signal is changed by stages in each frame.

Further, it is preferable to arrange the cycle of the horizontal synchronization signal is changed by stages in each frame.

According to the foregoing arrangement, the cycle of the vertical synchronization signal is changed by stages in each frame, so that the cycle can be changed in accordance with an image displayed.

Further, it is preferable to arrange the display controller of the present invention so as to comprise a power control signal generation device to generate a power control signal which controls operation of a power source circuit and an analog circuit included in the display device, wherein the power control signal causes the power source circuit and the analog circuit to be OFF in at least part of an inactive period in which the video data is not supplied to the display device, said video data being supplied to the display device in an active period.

Further, it is preferable to arrange the method of the present invention for controlling a display device so that: a power control signal which controls operation of a power source circuit and an analog circuit included in the display device is generated, and the power control signal causes the power source circuit and the analog circuit to be OFF in at least part of an inactive period in which the video data is not supplied to the display device, said video data being supplied to the display device in an active period.

The power source circuit and the analog circuit are included in the display device, and these circuits always bring about self power loss regardless of a state of the display device. The self power loss makes it difficult to reduce power consumption. Although it is possible to reduce power consumption by decreasing the refresh rate, a refresh rate smaller than 40 Hz causes flicker, so that it is impossible to further decrease the refresh rate.

According to the foregoing arrangement, the power control signal which controls operation of the power source circuit and the analog circuit included in the display device is supplied, wherein the power control signal causes the power source circuit and the analog circuit to be OFF in at least part of an inactive period in which the video data is not supplied to the display device, said video data being supplied to the display device in an active period. Thus, while displaying an image based on video data, the circuits included in the display device is turned OFF in the non-active period in which it is not necessary to write video data into the pixels. That is, substantially no self power loss is brought about in these circuits without having any influence in displaying an image based on the video data. Thus, it is possible to reduce power consumption while preventing occurrence of flicker.

Further, it is preferable to arrange the display controller of the present invention so that the power control signal generation device uses the power control signal so as to cause the circuits to be ON in starting preparation for writing of the video data into the pixels and so as to cause the circuits having been turned ON to be OFF in finishing the writing of the video data into the pixels.

Further, it is preferable to arrange the method for controlling a display device so that the power control signal is used to cause the circuits to be ON in starting preparation for writing of the video data into the pixels and to cause the circuits having been turned ON to be OFF in finishing the writing of the video data into the pixels.

It takes some time for the power source circuit and the power source circuit to become directly in a normal operation state after being turned ON. Thus, it is necessary to make a ready time before the writing operation (normal operation) in turning the circuits ON, and the ready time is regarded as preparation for the writing operation.

According to the foregoing arrangement, the power control signal is used to cause the circuits to be ON in starting preparation for writing of the video data into the pixels and to cause the circuits having been turned ON to be OFF in finishing the writing of the video data into the pixels. Thus, a period for sufficiently writing the video data into the pixels can be secured. In a period other than this, substantially no self power loss is brought about, thereby minimizing power consumption.

Further, it is preferable to arrange the display controller of the present invention so that: in case of supplying the dot clock, the video data, the horizontal synchronization signal, and the vertical synchronization signal to the display device based on a differential transfer method, the power control signal is included in data used in the differential transfer method.

Further, it is preferable to arrange the method of the present invention for controlling a display device so that: in case of supplying the dot clock, the video data, the horizontal synchronization signal, and the vertical synchronization signal to the display device based on a differential transfer method, the power control signal is included in data used in the differential transfer method.

In case of supplying the dot clock, the video data, the horizontal synchronization signal, and the vertical synchronization signal to the display device based on a differential transfer method, preliminary data which is not used in data communications is included in data used in the differential transfer method. According to the foregoing arrangement, the power control signal is included in this data. That is, the power control signal is supplied by using a signal line used in the differential transfer method. Therefore, it is possible to avoid such disadvantage that the number of wirings increases due to supply of the power control signal.

Further, it is preferable to arrange the display controller of the present invention so that the refresh rate is changed in accordance with whether an image displayed on the screen of the display device is a still image or a moving image.

Further, it is preferable to arrange the method for controlling a display device so that the refresh rate is changed in accordance with whether an image displayed on the screen of the display device is a still image or a moving image.

According to the foregoing arrangement, the refresh rate mode is switched in accordance with whether an image displayed on the screen of the display device is a still image or a moving image. Thus, a refresh rate mode according to each image can be selected, and power consumption can be reduced by selecting a low refresh rate mode in case where the image is a still image. In addition, image quality can be enhanced by selecting a high refresh rate mode in case where the image is a moving image.

Further, it is preferable that a graphic LSI is used as the display controller.

Further, it is preferable to arrange the method for controlling a display device so that a graphic LSI is used to control the display device.

Further, it is preferable that a display device of the present invention is controlled by the display controller based on any one of the foregoing arrangements.

Further, it is preferable to arrange the display device of the present invention so as to include a power source circuit and an analog circuit, wherein the display device receives the power control signal from the display controller as set forth in any one of claims 7 to 9, and ON/OFF of the power source circuit and the analog circuit is controlled in accordance with the power control signal.

Further, it is preferable to arrange the method of the present invention for controlling a display device so that: the display device includes a power source circuit and an analog circuit, and ON/OFF of the power source circuit and the analog circuit is controlled in accordance with the power control signal.

Further, it is preferable to arrange the display device of the present invention so that ON/OFF of the power source circuit and the analog circuit is controlled at least once in a single frame.

Further, it is preferable to arrange the method of the present invention for controlling a display device so that ON/OFF of the power source circuit and the analog circuit is controlled at least once in a single frame.

Further, it is preferable to arrange the display device of the present invention so that an image based on the video data is displayed on the screen also in controlling ON/OFF of the power source circuit and the analog circuit.

Further, it is preferable to arrange the method of the present invention for controlling a display device so that an image based on the video data is displayed on the screen also in controlling ON/OFF of the power source circuit and the analog circuit.

Note that, the ON/OFF control recited in claims means at least either to "turn ON from an OFF state" or to "turn OFF from an ON state".

Further, it is preferable that a display system of the present invention includes the display controller based on any one of the foregoing arrangements and the display device based on any one of the foregoing arrangements.

As described above, a display controller of the present invention is capable of changing a refresh rate indicative of how often a screen displayed on a display device having plural pixels is switched and generates (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, said display controller comprising a dot clock generation device to generate the dot clock whose frequency is constant without depending on a change of the refresh rate.

Further, a method of the present invention for controlling a display device allows a change of a refresh rate indicative of how often a screen displayed on a display device having plural pixels is switched and allows generation of (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, wherein a frequency of the dot clock is made constant without depending on the change of the refresh rate.

Thus, it is possible to prevent occurrence of noise caused by a change of the dot clock and also possible to prevent image disarrangement caused by the noise.

Further, as described above, a display controller of the present invention is capable of changing a refresh rate indicative of how often a screen displayed on a display device having plural pixels is switched and generates (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, said display controller comprising a horizontal synchronization signal generation device to generate the horizontal synchronization signal whose cycle is constant without depending on a change of the refresh rate.

Further, a method of the present invention for controlling a display device allows a change of a refresh rate indicative of how often a screen displayed on a display device having plural pixels is switched and allows generation of (i) a dot clock serving as a timing signal indicative of a timing of operation in the display device, (ii) video data indicative of an image to be displayed on the screen, (iii) a horizontal synchronization signal for defining a horizontal period of a display on the screen, and (vi) a vertical synchronization signal for defining a vertical period of the display on the screen, so as to supply the dot clock, the video data, the horizontal synchronization signal, and the vertical synchronization signal to the display device, wherein a cycle of the horizontal synchronization signal is made constant without depending on the change of the refresh rate.

Thus, a charging rate in the pixels less varies. As a result, in case where the refresh rate is sequentially switched between the low refresh rate mode and the high refresh rate mode, this does not give the user unnatural feeling.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is favorably applicable particularly to mobile devices such as a mobile phone and next-generation one-segment LCD and UMPC.

The invention claimed is:

1. A method for controlling a display device having plural pixels, said method comprising the steps of:

generating video data to be displayed on a screen;

generating a horizontal synchronization signal for defining a horizontal period of a display on the screen;

generating a vertical synchronization signal for defining a vertical period of the display on the screen;

generating a power control signal which controls operation of a power source circuit and an analog circuit included in the display device; and supplying the video data, the horizontal synchronization signal, the vertical synchronization signal, and the power control signal to the display device so as to control the display device, wherein said method allows a change of a refresh rate indicative of how often a screen display of the display device is updated, a cycle of the horizontal synchronization signal is fixed without depending on the change of the refresh rate, the power control signal is controlled in accordance with the horizontal synchronization signal, and a period, in which the video data is active, is fixed without depending on the change of the refresh rate, wherein a period, in which the power control signal is active, is fixed without depending on the change of the refresh rate, wherein, a power-control-signal start point from which the power control signal becomes active in a single vertical period is set before a video-data start point from which the video data becomes active, and a power-control-signal end point until which the power control signal is active in the single vertical period is set after a video-data end point until which the video data is active, and wherein the power control signal (i) is reset in response to an input of the vertical synchronization signal, (ii) becomes at a high level at a point which comes earlier than the video-data start point by m (m is an integer) times as long as the horizontal period, and (iii) becomes at a low level at a point which comes later than the video-data end point by n (n is an integer) times as long as the horizontal period.

2. The method as set forth in claim 1, wherein, in case of supplying a dot clock, the video data, the horizontal synchronization signal, and the vertical synchronization signal to the display device based on a differential transfer method, the power control signal is included in data used in the differential transfer method.

3. A display controller for controlling a display device by use of a method as set forth in claim 1.

4. A display device to be controlled by use of a method as set forth in claim 1.

* * * * *